Patented Apr. 19, 1949

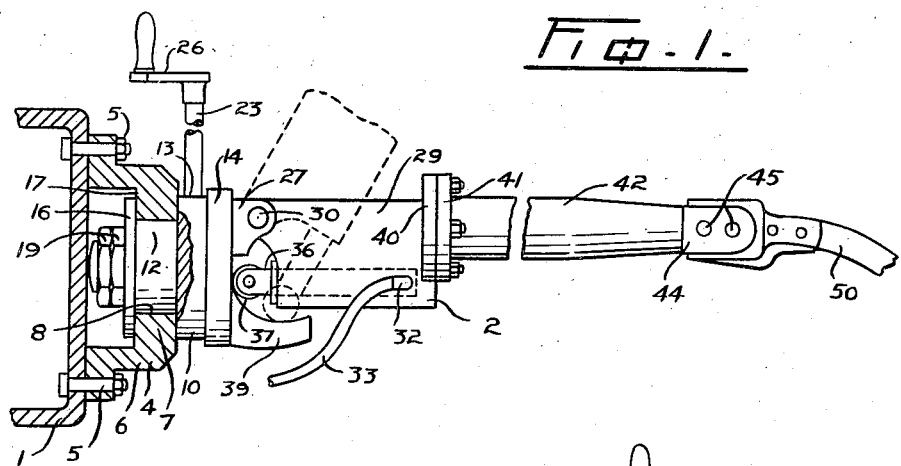

2,467,616

UNITED STATES PATENT OFFICE 2,467,616

POWER-OPERATED IMPLEMENT LIFT ARM

Charles A. French, Eburne, British Columbia, Canada

Application March 29, 1947, Serial No. 738,053

2 Claims. (Cl. 97—50)

My invention relates to improvements in tractor hoists. The objects of the invention are to provide a device adapted for attachment to a self-propelled vehicle, particularly a tractor, to which any desired type of implement may be secured, raised for transportation or lowered or tilted as may be necessary for the proper use of said implement; to provide a tool which can be used either to draw or push an implement to do its work, and to provide a tool which is exceptionally rugged so that side or other unusual strains will cause no damage to the device and the use of extraneous braces or struts are unnecessary.

In the conventional type of hoist used on tractors, earth cannot be removed close to a fence or wall by a scraper because said scraper must be set with its cutting edge towards the tractor vehicle, whereas with the present invention the scraper can be set with its cutting edge to the rear and be driven rearwardly right up to the otherwise inaccessible boundary to remove unwanted earth.

The invention contemplates a face plate rockably mounted in a base bracket and an arm pivotally mounted upon said base plate and a hydraulic ram for swinging the arm, as will be more fully described in the following specification and shown in the accompanying drawings, in which—

Fig. 1 is a side elevational view of the invention showing a part in section.

Fig. 2 is an elevational view taken from the free end of the arm.

Fig. 3 is a fragmentary sectional view of the cylinder block showing the hydraulic ram.

In the drawings like characters of reference indicate corresponding parts in each figure.

The numeral 1 indicates generally a rear transverse chassis member forming part of a tractor, to which the hoist generally indicated by the numeral 2, is fitted. The numeral 4 indicates a base bracket attached by bolts 5 to the chassis member 1 and provided with a cylindrical projection 6, the end 7 of which is bored as at 8 to form a bearing for a face plate 10. The face plate 10 consists of a stub shaft 12 which is journalled in the bearing 8, a circular neck portion 13 and a front plate 14. The stub shaft is fitted at its inner end with a washer 16 bearing on the inner end wall 17 of the cylindrical portion 6 of the base bracket 4 and is held in place by lock nuts 19.

Secured to the periphery of the neck 13 is a worm gear segment 21 which is engaged by a worm 22 secured to a vertical shaft 23, which shaft is journalled in bearings 24 extending from the base bracket 4. The shaft 23 is extended upwardly to any suitable height and is fitted with a hand crank 26 for the purpose of rotating the worm 22 to rock the face plate 10 about its horizontal axis. A hinge lug 27 is provided upon the face plate 14 to which a cylinder block 29 is connected by a pin 30. The block 29 is bored horizontally to define a hydraulic cylinder 31, see Figure 3, having an inlet connection 32 to which a flexible hose 33 leading from a suitable source of hydraulic fluid, not shown, is connected. The cylinder 31 is fitted with a ram 35 having a fork 36 at its outer end which journals a roller 37. The roller 37 bears and rides upon an arcuate cam 39 carried upon the face plate 14 below the hinge lugs 27. The block 29 is preferably flanged at its free end as at 40 to receive a similar flange 41 of an arm 42. The arm 42 is provided with a fork 44 which is apertured and fitted with one or more loose pins 45 for the purpose of connecting any desired implement 50 to the arm.

Assuming the implement 50 to be a plow, in which case the right wheel of the tractor vehicle will be required to run in a furrow and the transverse member 1 attached to said vehicle to be out of horizontal, it will be necessary to level the plow transversely in order that all shares will cut to the same depth level. To level the shares of the plow, the hand crank 26 is rotated to cause the worm 22 to turn the face plate 14, the block 29 and the arm 42 about the longitudinal axis of the face plate an appropriate degree to bring the hinge pin 30 to a horizontal position.

When the plow is to be raised out of ground contact, hydraulic fluid is forced into the cylinder 31 behind the ram 35, which thrusts said ram outwardly, causing the roller to bear upon the face of the arcuate cam 39 and tilt the block 29 and its associated arm parts upwardly towards the position indicated by dotted line in Figure 1. The swing of the arm 42 will be in a vertical plane at all times, so that the land side of the furrows cut will remain vertical and undamaged during the lifting process.

If a scraper bucket or bulldozer blade is used, the cut can be parallel with the tread of the tractor vehicle or inclined as desired by simply manipulating the hand crank in a desired direction. If any obstruction is encountered by the implement, tending to raise it above its set position, the roller 37 will recede from the cam face until the obstruction is overcome, when it will return to its appointed position on the cam and the implement will descend to its previous level.

By virtue of the use of a single rigid arm, an implement can be pushed as efficiently as it can be drawn.

What I claim as my invention is:

1. A tractor hoist comprising a base bracket adapted for attachment to a tractor vehicle, a face plate upon the base bracket, said face plate having a horizontally disposed hinge lug and an arcuate cam below said lug, an arm member hinge connected to the hinge lug, said arm member being adapted for connection to an implement, a hydraulic cylinder carried below the longitudinal axis of and substantially parallel to said arm member, a ram within said cylinder adapted to bear upon and travel upon the face of the cam to swing said arm in an upward direction, and means for admitting hydraulic fluid to the cylinder.

2. A tractor hoist comprising a base bracket adapted for attachment to a tractor vehicle, a face plate upon the base bracket, said face plate having a horizontally disposed hinge lug and an arcuate cam below said lug, a cylinder block hinge connected to the lug, said block having an arm member normally extending horizontally outwards from the face plate and adapted for connection to an implement and having a hydraulic cylinder formed therein, said cylinder having a ram adapted to extend from the hinged end of the arm towards the face plate to engage the face of the cam to raise the arm member.

CHARLES A. FRENCH.

REFERENCES CITED

The following references are of record in the file of this patent:

UNITED STATES PATENTS

| Number | Name | Date |
|---|---|---|
| 383,967 | McDonald | June 5, 1888 |
| 2,134,848 | Anderson | Nov. 1, 1938 |
| 2,163,982 | Mercier | June 27, 1939 |
| 2,321,406 | Merchant | June 8, 1943 |
| 2,364,367 | Janke | Dec. 5, 1944 |
| 2,394,210 | Sherman | Feb. 5, 1946 |